Jan. 2, 1923.
A. F. SULZER.
ANTISTATIC PHOTOGRAPHIC FILM AND FILM BASE.
FILED FEB. 26, 1921.
1,441,185.
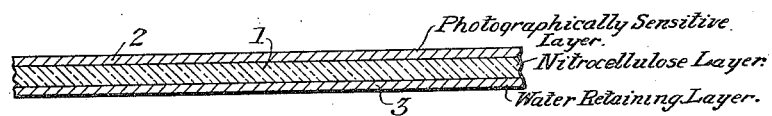
WITNESS
INVENTOR
Albert F. Sulzer,
BY
ATTORNEY Patented Jan. 2, 1923.

1,441,185

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

ANTISTATIC PHOTOGRAPHIC FILM AND FILM BASE.

Application filed February 26, 1921. Serial No. 448,014.

*To all whom it may concern:*

Be it known that I, ALBERT F. SULZER, a citizen of the United States of America, residing at Rochester, in the county of Monroe and State of New York, have invented certain new and useful Improvements in Antistatic Photographic Films and Film Bases, of which the following is a full, clear, and exact specification.

This invention relates to an anti-static photographic film and to the base or support thereof. The principal object of my invention is to provide a photographic film having a support or base such that the product possesses the usual commercial qualities and in addition has the ability of preventing or greatly minimizing markings due to electrical discharges which are customarily referred to in the motion picture art as "static." Other objects will hereinafter appear.

I have found that a film having these characteristics may be prepared by coating an ordinary film having a nitrocellulose support with a certain varnish or layer on its rear face,—that is, the face opposite the sensitive emulsion. In this anti-static coating or layer I incorporate such preferred substances as glucose and glycerin with small amounts of water. In place of these preferred organic hygroscopic materials I may substitute similar organic compounds of low volatility which are hygroscopic or have a considerable ability for retaining water in the layer and are at the same time substantially inert toward the photographic coatings with which they contact when the film is coiled up.

In the accompanying drawing the figure is a sectional view on an exaggerated scale of a film embodying my invention.

1 represents the ordinary nitrocellulose base in which the cellulosic material is mixed with various softening or other modifying agents. 2 is the photographically sensitive coating of the gelatino-silver haloid type. In the preferred form of my invention layer 2 is a highly sensitive negative emulsion. On that surface of nitrocellulose layer 1, which is opposite the emulsion 2, I place the anti-static varnish or coating 3. This coating may be put on the film after the emulsion layer has been applied or a compound base comprising layer 1 and layer 3 may be manufactured before the sentitive layer 2 is applied, such compound base thus being a novel article of manufacture.

In the preferred form of my invention, which will be described in detail by way of illustration, I add to a nitrocellulose solution an amount of glucose equal to from 2 to 4% of the weight of the nitrocellulose and an amount of glycerin equal to from 2 to 4% of the weight of nitrocellulose. Also an amount of water equal to from 2 to 4% of the weight of nitrocellulose is likewise added. Of course, these proportions are merely illustrative and may be varied considerably according to the thickness of the dope and the methods of spreading and drying the latter upon the rear of the main nitrocellulose film support or base.

I may, for example, use a nitrocellulose solution comprising 100 parts of nitrocellulose, 200 to 400 (say 250) parts of acetone, 200 to 400 (say 250) parts of methyl alcohol, 20 to 200 (say 40) parts of fusel oil. If a thinner solution is desired, I may greatly increase the amounts of acetone and methyl alcohol. Likewise from 1 to 30 (say 10) parts of camphor may be added. I separately mix say 4 parts of glucose, 4 parts of glycerin and 4 parts of water and then incorporate this mixture in the above described nitrocellulose solution.

The ingredients are of the commercial type, sufficiently purified to yield an anti-static coating of the desired transparency and relative freedom from color. Of course, a wide variety of equivalent volatile solvents may be substituted or used with the acetone or methyl alcohol. For the fusel oil, the other monohydroxy aliphatic alcohols of from 4 to 5 carbon atoms like normal butyl and isobutyl alcohols can be substituted. As previously stated, the dope or varnish is diluted with the volatile solvent until it is the right consistency for spreading in the form of a thin coating on a face of the main nitrocellulose film support or base. Since various methods of applying such varnish are well known in the art, a description of them is unnecessary.

A film having such a coating or layer on the rear face is notably resistant to defects from electrical discharges, while at the same time it maintains the properties of a successful commercial film. It appears probable that the increased electrical conductivity of the layer 3, due to the moisture which is trapped or held therein by the glucose and glycerin, is the reason for the anti-static function, nevertheless, I do not wish to be bound to any particular theory. It should be noted that the water, when incorporated with the other substances in the coating, in the manner set forth in the examples given above, does not segregate in the coating under the usual manufacturing conditions, so as to impair the transparency of the coating in any appreciable way.

Having thus described my invention, what I claim as new and desire to secure by Letters Patent is:

1. A photographic film comprising a nitrocellulose support carrying on one face a sensitive coating and on the other face a layer containing in a supporting substance water and an inert hygroscopic organic compound of low volatility for retaining and preventing the precipitation of said water.

2. A photographic film comprising a nitrocellulose support carrying on one face a sensitive coating and on the other face a layer containing in a supporting substance a sugar, an inert hygroscopic organic compound of low volatility and water.

3. A photographic film comprising a nitrocellulose support carrying on one face a sensitive coating and on the other face a layer containing in a supporting substance a sugar, glycerin and water.

4. A photographic film comprising a nitrocellulose support carrying on one face a sensitive coating and on the other face a layer containing in a supporting substance glucose, an inert hygroscopic organic compound of low volatility and water.

5. A photographic film comprising a nitrocellulose support carrying on one face a sensitive coating and on the other face a layer containing in a supporting substance glucose, glycerin and water.

6. A flexible transparent compound base or support adapted to receive sensitive photographic coatings, which comprises a main nitrocellulose layer and a second nitrocellulose layer containing water and an inert hygroscopic organic compound of low volatility for retaining and preventing the precipitation of said water.

7. A flexible transparent compound base or support adapted to receive sensitive photographic coatings, which comprises a main nitrocellulose layer and a second nitrocellulose layer containing a sugar, an inert hygroscopic organic compound of low volatility and water.

8. A flexible transparent compound base or support adapted to receive sensitive photographic coatings, which comprises a main nitrocellulose layer and a second nitrocellulose layer containing a sugar, glycerin and water.

9. A flexible transparent compound base or support adapted to receive sensitive photographic coatings, which comprises a main nitrocellulose layer and a second nitrocellulose layer containing glucose, an inert hygroscopic organic compound of low volatility and water.

10. A flexible transparent compound base or support adapted to receive sensitive photographic coatings, which comprises a main nitrocellulose layer and a second nitrocellulose layer containing glucose, glycerin and water.

Signed at Rochester, New York, this 23rd day of February, 1921.

ALBERT F. SULZER.